United States Patent
Ando et al.

(10) Patent No.: US 9,902,334 B2
(45) Date of Patent: Feb. 27, 2018

(54) FASTENING STRUCTURE OF ONBOARD APPARATUS

(71) Applicants: MITSUBISHI JIDOSHA KOGYO KABUSHIKI KAISHA, Tokyo (JP);
MITSUBISHI JIDOSHA ENGINEERING KABUSHIKI KAISHA, Okazaki-shi, Aichi (JP)

(72) Inventors: Toshihiko Ando, Toyota (JP); Shinsuke Horibe, Kitanagoya (JP); Yoshio Hiraiwa, Okazaki (JP)

(73) Assignees: MITSUBISHI JIDOSHA KOGYO KABUSHIKI KAISHA, Tokyo (JP); MITSUBISHI JIDOSHA ENGINEERING KABUSHIKI KAISHA, Okazaki-shi (JP)

( * ) Notice: Subject to any disclaimer, the term of this patent is extended or adjusted under 35 U.S.C. 154(b) by 0 days.

(21) Appl. No.: 14/971,705

(22) Filed: Dec. 16, 2015

(65) Prior Publication Data
US 2016/0176354 A1    Jun. 23, 2016

(30) Foreign Application Priority Data

Dec. 17, 2014 (JP) ................................. 2014-255435

(51) Int. Cl.
*F16M 11/00*    (2006.01)
*B60R 11/00*    (2006.01)
(Continued)

(52) U.S. Cl.
CPC ............... *B60R 11/00* (2013.01); *B60K 1/04* (2013.01); *F16M 13/02* (2013.01); *B60R 2011/0049* (2013.01)

(58) Field of Classification Search
CPC ............................. B60L 3/0007; B62D 21/15
(Continued)

(56) References Cited

U.S. PATENT DOCUMENTS 6,494,431 B1 * 12/2002 McCoy ................. B63H 20/10
248/640
7,770,927 B2 * 8/2010 Dandekar ............... B60R 19/12
180/312

(Continued)

FOREIGN PATENT DOCUMENTS

JP    2009-90818 A    4/2009
JP    4943494 B2    5/2012

*Primary Examiner* — Steven M Marsh
(74) *Attorney, Agent, or Firm* — Birch, Stewart, Kolasch & Birch, LLP

(57) ABSTRACT

A fastening structure of an onboard apparatus to be fastened to a vehicle body includes a support member that is fastened to the vehicle body to support the onboard apparatus and has a protruding section protruding rearward beyond a rear face of the onboard apparatus, and a bracket having a front fastening section to be fastened to a lower face of a rear section of the onboard apparatus, a rear fastening section to be fastened to the protruding section of the support member, and a fragile section provided between the front fastening section and the rear fastening section. By an external force from a front side of the onboard apparatus, the fragile section is deformed and the rear section of the onboard apparatus is moved upward using the rear fastening section as a fulcrum.

9 Claims, 4 Drawing Sheets

(51) Int. Cl.
*B60K 1/04* (2006.01)
*F16M 13/02* (2006.01)

(58) Field of Classification Search
USPC .......................... 248/637, 640; 180/232, 291
See application file for complete search history.

(56) References Cited

U.S. PATENT DOCUMENTS

| | | | | |
|---|---|---|---|---|
| 9,150,253 | B2 * | 10/2015 | Watanabe | B62D 21/11 |
| 9,381,941 | B2 * | 7/2016 | Segawa | B62D 21/152 |
| 2003/0136601 | A1 * | 7/2003 | Gotou | B62D 21/15 |
| | | | | 180/291 |
| 2007/0046041 | A1 * | 3/2007 | Thomas | B60R 19/56 |
| | | | | 293/102 |
| 2015/0283955 | A1 * | 10/2015 | Sakamoto | F16B 5/0241 |
| | | | | 248/636 |

* cited by examiner

FASTENING STRUCTURE OF ONBOARD APPARATUS

CROSS REFERENCE TO RELATED APPLICATION

This application is based on Japanese Patent Application No. 2014-255435 filed on Dec. 17, 2014, the contents of which are incorporated herein by reference.

BACKGROUND

1. Technical Field

The present invention relates to a fastening structure of an apparatus to be mounted on a vehicle (hereafter referred to as an onboard apparatus).

2. Related Art

Various apparatuses, such as a power plant and auxiliary apparatuses, are disposed in an engine room (or a motor room) on the front side of a vehicle. These apparatuses are fastened to the vehicle body and mounted so that the occupants inside the passenger compartment are not adversely affected not only at the time of ordinary traveling but also at the time of a collision and at the time of turning. For example, a structure has been proposed in which an onboard apparatus is detachably fastened to the vehicle body and the onboard apparatus is unfastened and detached when an external force is applied thereto due to a collision, whereby the onboard apparatus is prevented from making contact with apparatuses disposed behind the onboard apparatus, and another structure has been proposed in which a guide member for guiding a detached onboard apparatus in a predetermined direction is provided (refer to JP-A-2009-90818 and Japanese Patent No. 4943494).

However, in the structure in which the onboard apparatus is detached from the vehicle body so that the onboard apparatus is prevented from making contact with apparatuses disposed behind the onboard apparatus, the onboard apparatus may move in an unexpected direction depending on the direction of the external force input to the onboard apparatus, whereby there is a risk that the onboard apparatus cannot avoid making contact with other apparatuses. Furthermore, in the case that the guide member for guiding the detached onboard apparatus in a predetermined direction is provided, the increase in the weight and cost of the guide member is unavoidable.

In particular, in an electric vehicle and a hybrid vehicle in which an electric motor is provided as a drive source (hereafter, these vehicles are generally referred to as electric motor vehicles), an inverter for converting DC power into AC power between a driving battery and an electric motor is mounted. Since the inverter is equipped with a portion having a voltage higher than those in other apparatuses, if the inverter interferes with other apparatuses and is broken at the time of a vehicle collision, there is a risk that the high-voltage portion may be exposed and cause secondary damage, such as electric leakage.

The present invention has been devised in consideration of the problems described above, and an object of the present invention is to provide a fastening structure of an onboard apparatus capable of enhancing the protecting property of the onboard apparatus at the time of a vehicle collision while increase in weight and cost is suppressed. However, the object of the present invention is not limited to the above-mentioned object, but an object of providing operational advantages that are derived from the various configurations designated in a mode for carrying out the present invention described below and not obtained by conventional technologies can be positioned as another object of the present invention.

SUMMARY (1) According to an aspect of the invention, a fastening structure of an onboard apparatus to be fastened to a vehicle body includes a support member that is fastened to the vehicle body to support the onboard apparatus and has a protruding section protruding rearward beyond a rear face of the onboard apparatus, and a bracket having a front fastening section to be fastened to a lower face of a rear section of the onboard apparatus, a rear fastening section to be fastened to the protruding section of the support member, and a fragile section provided between the front fastening section and the rear fastening section. By an external force from a front side of the onboard apparatus, the fragile section is deformed and the rear section of the onboard apparatus is moved upward using the rear fastening section as a fulcrum.

(2) In the fastening structure of the onboard apparatus of (1), the bracket has a bottom face section extending in a front-rear direction and two side face sections standing upward from both the edge sections of the bottom face section extending in the front-rear direction, the fragile section includes side face beads provided on each of the two side face sections, extending in a standing direction of the side face sections and formed into a convex shape protruding inward or outward, and the side face beads extend up to upper edges of the side face sections.

(3) In the fastening structure of the onboard apparatus of (2), the side face beads are provided on each of the two side face sections side by side in the front-rear direction.

(4) In the fastening structure of the onboard apparatus of (2), the fragile section includes a bottom face bead provided on the bottom face section, extending in a direction orthogonal to an extension direction of the bottom face section and formed into a convex shape protruding inward.

(5) In the fastening structure of the onboard apparatus of (4), the side face beads are provided on each of the two side face sections so that two side face beads are provided side by side in the front-rear direction, and the bottom face bead is one bottom face bead positioned between the two side face beads provided side by side.

(6) In the fastening structure of the onboard apparatus of (2), the closer to the front side a position gets, the smaller the length of each of the two side face sections of the bracket in an up-down direction becomes.

(7) In the fastening structure of the onboard apparatus of (2), the closer to the front side a position gets, the larger a length of the bottom face section in a vehicle width direction.

(8) In the fastening structure of the onboard apparatus of (2), a front edge section of the bottom face section is formed into a curved shape.

(9) In the fastening structure of the onboard apparatus of (2), the fragile section further includes a hole section provided on the bottom face section at a front side with respect to the side face beads in the front-rear direction.

(10) According to another aspect of the invention, a fastening structure of an onboard apparatus to be fastened to a vehicle body includes a support member that is fastened to the vehicle body to support the onboard apparatus and has a protruding section protruding frontward beyond a front face of the onboard apparatus, and a bracket having a rear fastening section to be fastened to a lower face of a front section of the onboard apparatus, a front fastening section to be fastened to the protruding section of the support member, and a fragile section provided between the front fastening section and the rear fastening section. By an external force from a rear side of the onboard apparatus, the fragile section is deformed and the front section of the onboard apparatus is moved upward using the front fastening section as a fulcrum.

(11) In the fastening structure of the onboard apparatus of (10), the bracket has a bottom face section extending in a front-rear direction and two side face sections standing upward from both the edge sections of the bottom face section extending in the front-rear direction, the fragile section includes side face beads provided on each of the two side face sections, extending in a standing direction of the side face sections and formed into a convex shape protruding inward or outward, and the side face beads extend up to upper edges of the side face sections.

(12) In the fastening structure of the onboard apparatus of (11), the side face beads are provided on each of the two side face sections side by side in the front-rear direction.

(13) In the fastening structure of the onboard apparatus of (11), the fragile section includes a bottom face bead provided on the bottom face section, extending in a direction orthogonal to an extension direction of the bottom face section and formed into a convex shape protruding inward.

(14) In the fastening structure of the onboard apparatus of (13), the side face beads are provided on each of the two side face sections so that two side face beads are provided side by side in the front-rear direction, and the bottom face bead is one bottom face bead positioned between the two side face beads provided side by side.

(15) In the fastening structure of the onboard apparatus of (11), the closer to the rear side a position gets, the smaller the length of each of the two side face sections of the bracket in an up-down direction becomes.

(16) In the fastening structure of the onboard apparatus of (11), the closer to the rear side a position gets, the larger a length of the bottom face section in a vehicle width direction.

(17) In the fastening structure of the onboard apparatus of (11), a rear edge section of the bottom face section is formed into a curved shape.

(18) In the fastening structure of the onboard apparatus (11), the fragile section further includes a hole section provided on the bottom face section at a rear side with respect to the side face beads in the front-rear direction.

With the fastening structure of the onboard apparatus disclosed above, when an external force is input due to a vehicle collision, the rear section of the onboard apparatus can be moved upward by the fragile section. Furthermore, since the fragile section is provided on the bracket for fastening the onboard apparatus, increase in weight and cost can be suppressed. Consequently, the protecting property of the onboard apparatus at the time of a vehicle collision can be enhanced while increase in weight and cost is suppressed.

BRIEF DESCRIPTION OF THE DRAWINGS

FIG. 5A is a view showing a state before a collision (an ordinary state), and FIG. 5B is a view showing a state after a collision; FIG. 6A is a top view and FIG. 6B is a left side view.

DETAILED DESCRIPTION OF THE EMBODIMENTS

Figure 1:
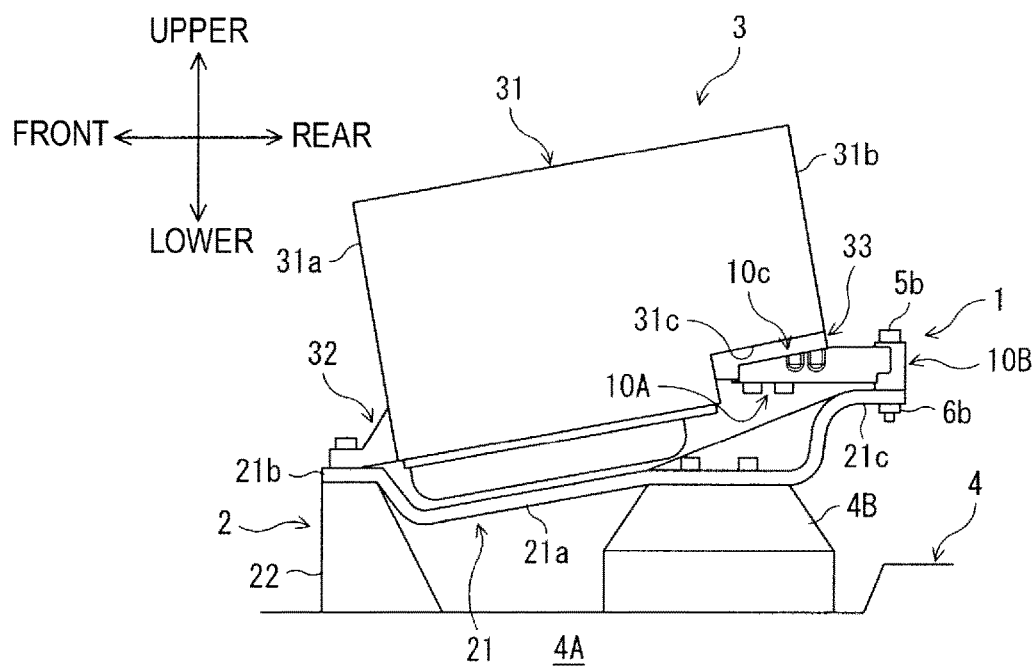
FIG. 1 is a schematic left side view showing a fastening structure of an onboard apparatus according to an embodiment.

A fastening structure of an onboard apparatus according to an embodiment will be described referring to the drawings. The embodiment described below is merely one example, and various modifications and technological applications not specified in the following embodiment are not intended to be excluded. The respective configurations of the embodiment can be variously modified and made without departing from the spirit of the embodiment and can be selected as necessary or combined appropriately. In the following descriptions, the traveling direction of a vehicle is defined as the front side of the vehicle. The left and right sides are determined on the basis of the front side. The direction of gravity is defined as the lower side, and the direction opposite thereto is defined as the upper side. Furthermore, in the descriptions of an apparatus or a component to be mounted on a vehicle, the up-down direction, the left-right direction and the front-rear direction thereof are determined on the basis of the state in which the apparatus or the component is mounted on the vehicle.

[1. Configuration]

As shown in FIG. 1, the fastening structure according to the embodiment is a structure for fastening an onboard apparatus 3 to be disposed in an engine room or a motor room (space) provided on the front side of a vehicle to a vehicle body 4. The onboard apparatus 3 according to the embodiment is an inverter for converting DC power into AC power between an electric motor serving as a drive source and a driving battery (these are not shown) and is disposed inside the motor room. In other words, the vehicle according to the embodiment is an electric vehicle or a hybrid vehicle (electric motor vehicle) equipped with an electric motor serving as a drive source. In addition to the inverter 3, various apparatuses, such as an electric motor, a battery for auxiliary apparatuses and an air conditioner, are mounted inside the motor room.

Figure 2:
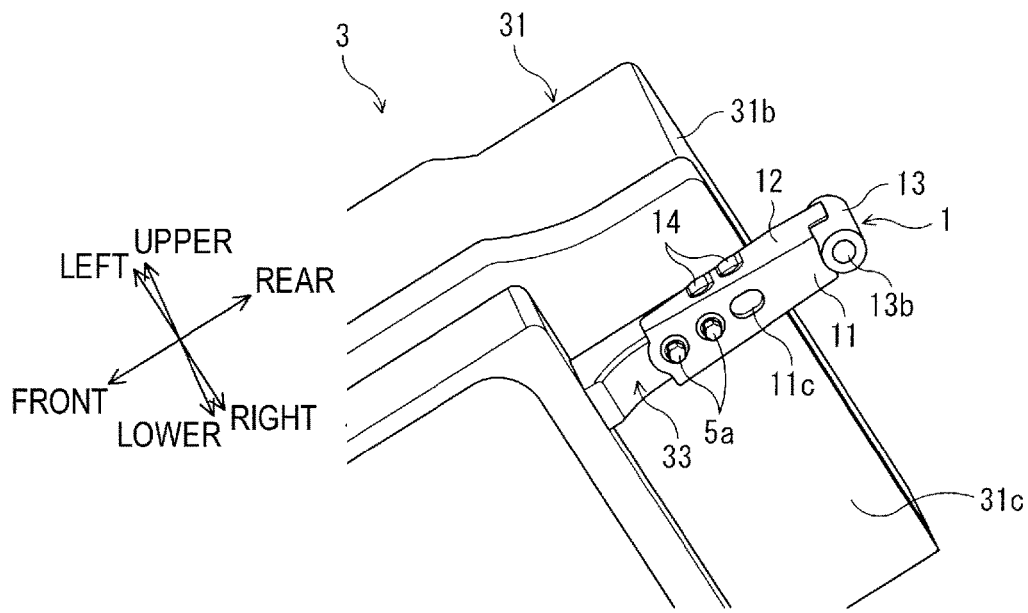
FIG. 2 is a perspective view showing the periphery of a bracket to be applied to the fastening structure shown in FIG. 1 as viewed from the left lower rear side.

The inverter 3 has a high voltage portion inside a housing 31 and also has connectors and cable connection sections (these are not shown) on the outer faces thereof. Front fastening sections 32 to be fastened to a support member 2 are provided so as to protrude forward at the lower section of the front face 31a of the inverter 3. On the other hand, as shown in FIG. 2, a stepped face 31c made higher by one step upward is provided on the lower face of the rear section of the inverter 3, and a rear fastening section 33 to which a bracket 1 is fastened is provided on this stepped face 31c. The front fastening sections 32, two in number, are provided with a distance therebetween in the vehicle width direction, and each of the front fastening sections 32 has a fastening hole section. The rear fastening section 33 is provided so as to protrude downward from the stepped face 31c, is a portion having a nearly rectangular parallelepiped shape and extended in the front-rear direction, and has two fastening hole sections. The rear face of the rear fastening section 33 is flush with the rear face 31b of the inverter 3.

As shown in FIG. 1, the inverter 3 is disposed in a forward leaning posture so that the rear section is raised slightly higher than the front section in the front-rear direction and fastened to the vehicle body 4 via the support member 2 and the bracket 1. The support member 2 is composed of a tray member 21 extended from the front side to the rear side of the inverter 3 and fastened to the mount 4B of the vehicle body 4 under the inverter 3 and a support base 22 fastened to the side member 4A of the vehicle body 4 on the front side of the inverter 3. The tray member 21 and the support base 22 are formed as separate components.

The tray member 21 has a flat section 21a extended along the lower face of the inverter 3, a flange section 21b curved upward from the front end of the flat section 21a and then curved forward so as to be formed into a gentle crank shape, and a protruding section 21c curved upward from the rear end of the flat section 21a and then curved rearward so as to be formed into a gentle crank shape.

The rear section of the flat section 21a is made contact with the upper face of the mount 4B and fastened with bolts, and the flange section 21b is provided so as to protrude forward from the front face 31a of the inverter 3 and to extend horizontally in the vehicle width direction and is held between the two front fastening sections 32 of the inverter 3 and the support base 22 and then fastened with bolts. The protruding section 21c is a portion protruding rearward from the rear face 31b of the inverter 3 and is made contact with the lower face of the bracket 1 and then fastened with a bolt. That is to say, the flat section 21a, the flange section 21b and the protruding section 21c of the tray member 21 are respectively provided with fastening hole sections.

The support base 22 is a member to be fastened on the upper face of the side member 4A, and the external shape thereof is formed into a quadrangular prism shape having a nearly trapezoidal shape in a side view. Fastening hole sections are provided on the upper face of the support base 22 extending in the vehicle width direction, and the flange section 21b of the tray member 21 is made contact with the upper face.

The bracket 1 is a fastening member (connection member) for supporting the rear section of the inverter 3 from the lower side and for fastening the rear section of the inverter 3 to the vehicle body 4 via the support member 2. Furthermore, in the case that an external force is input to the inverter 3 from the front side as in the case of a frontal vehicle collision, the bracket 1 has a function of controlling the locus (movement direction) of the rear section of the inverter 3 so that the rear section moves upward.

The bracket 1 has a front fastening section 10A to be fastened to the lower face (that is, the stepped face 31c) of the rear section of the inverter 3, a rear fastening section 10B to be fastened to the protruding section 21c of the support member 2, and a deformation promoting section 10C provided between the front fastening section 10A and the rear fastening section 10B. The front fastening section 10A and the rear fastening section 10B are respectively portions serving as the fastening points of the bracket 1. On the other hand, the deformation promoting section 10C is a portion for controlling the deformation of the bracket 1 in a deformation mode described later when an external force is applied to the bracket 1 from the front side.

Figure 3:
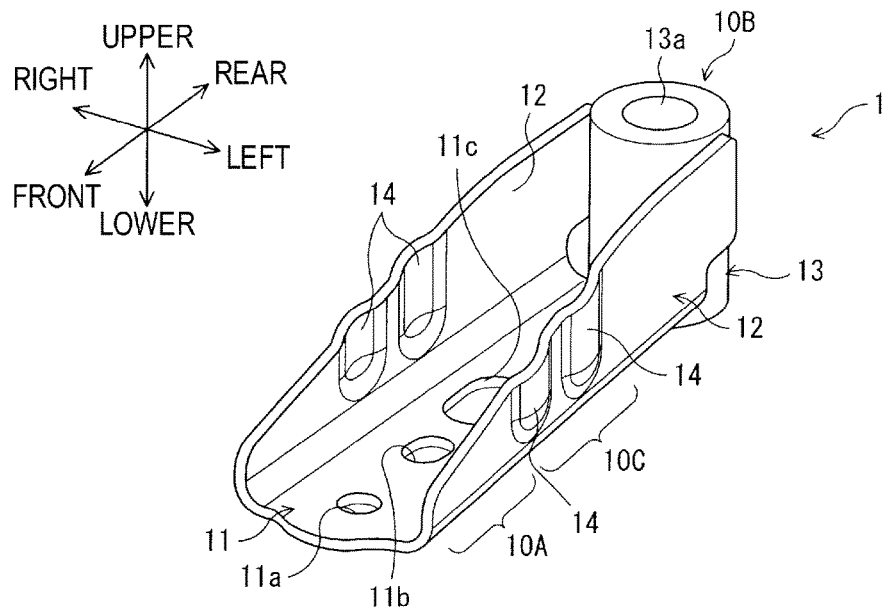
FIG. 3 is a perspective view showing the bracket shown in FIG. 2.
Figure 4A:
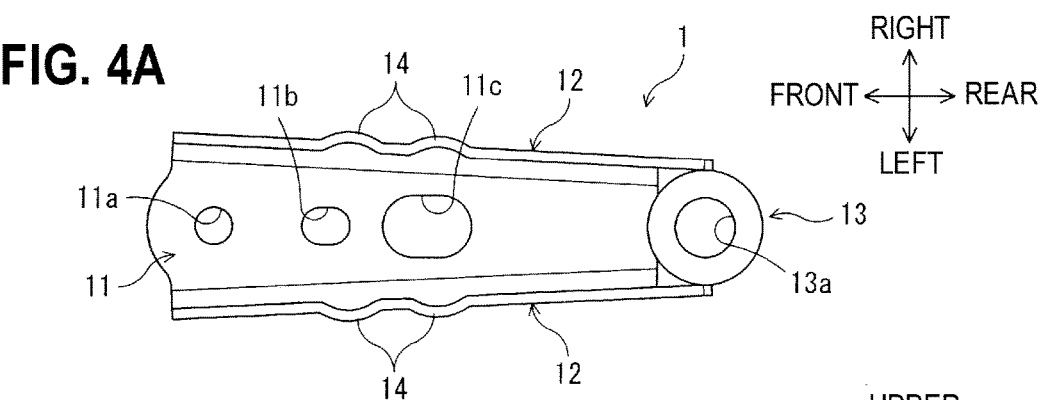
FIG. 4A is a top view showing the bracket shown in FIG. 2.
Figure 4B:
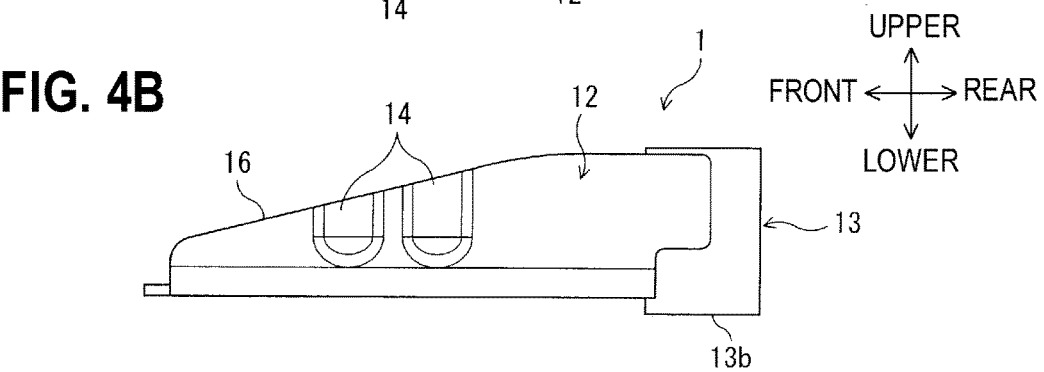
FIG. 4B is a left side view showing the bracket shown in FIG. 2.

As shown in FIGS. 3, 4A and 4B, the bracket 1 according to the embodiment is formed by combining a cylindrical section 13 and a U-shaped cross-sectional portion having a bottom face section 11 and two side face sections 12. The bracket 1 is formed plane-symmetrically with respect to an imaginary vertical face extending in the front-rear direction along the center line in the vehicle width direction. The bottom face section 11 is a flat portion extended in the front-rear direction, the length thereof in the vehicle width direction (hereafter referred to as the width) is slightly larger toward the front side, and the front edge section thereof is formed into a curved shape. The two side face sections 12 are face sections extending in the up-down direction and serving as portions standing upright so as to extend upward in the vertical direction from both the edge sections of the bottom face section 11 extending in the front-rear direction.

The bottom face section 11 and the two side face sections 12 are made of sheet metal and integrally formed, for example, by bending. Three hole sections 11a to 11c are bored in the front-rear direction along the center line in the width direction. In the following description, in the case that these hole sections 11a to 11c are distinguished particularly, they are referred to as a first hole section 11a, a second hole section 11b and a third hole section 11c in this order from the front side. The first hole section 11a and the second hole section 11b are hole sections for bolt insertion and are provided at the positions corresponding to the two hole sections of the rear fastening section 33 of the inverter 3. On the other hand, the third hole section 11c constitutes part of the deformation promoting section 10C described later and functions auxiliarily as a weight reduction hole for reducing the weight of the bracket 1 and also functions as a drain hole for discharging liquids, such as rainwater, paint and electrolyte during electrodeposition, accumulated in the bottom face section 11 of the bracket 1.

As shown in FIG. 2, the front sections of the bottom face section 11 and the two side face sections 12 are fitted on the rear fastening section 33 of the inverter 3 from the lower side, and bolts 5a are inserted into the first hole section 11a and the second hole section 11b of the bottom face section 11 and tightened, whereby the bracket 1 is fastened to the inverter 3. In other words, the front fastening section 10A according to the embodiment is composed of the front sections of the bottom face section 11 and the respective side face sections 12 and the two hole sections 11a and 11b. The length of the bottom face section 11 in the width direction is set depending on the length of the rear fastening section 33 of the inverter 3 in the vehicle width direction.

The cylindrical section 13 is a pipe-shaped member having an axial center extending in the up-down direction and a center hole 13a at the center, and the upper and lower end faces thereof are formed into a flat shape. As shown in FIG. 1, the lower end face 13b of the cylindrical section 13 is made contact with the upper face of the protruding section 21c so that the hole section of the protruding section 21c of the tray member 21 is aligned with the center hole 13a. Furthermore, a bolt 5b is inserted into the center hole 13a from the upper side of the bracket 1, a nut 6b is tightened from the lower side of the protruding section 21c, whereby the bracket 1 is fastened to the support member 2. In other words, the rear fastening section 10B according to the embodiment is composed of the cylindrical section 13.

As shown in FIGS. 4A and 4B, the two side face sections 12 extend in the upright direction (that is, the up-down direction) of the side face sections 12, and each of the two side face sections 12 has two side face beads 14 formed into a convex shape protruding toward the outside in the vehicle width direction. The two side face beads 14 are provided side by side with a slight distance therebetween at the nearly central position of each of the side face sections 12 in the front-rear direction. Like the side face sections 12, the side face beads 14 are made of sheet metal, and the number thereof is not limited particularly. In other words, a single side face bead 14 may be provided on each side face section 12 or the side face beads 14 may be provided at three or more positions on each side face section 12. The lower end of the side face bead 14 is formed into a curved shape and provided at a position not reaching the bottom face section 11. On the other hand, the upper end of the side face bead 14 is provided at a position reaching the upper end of the side face section 12. In other words, the side face bead 14 is extended up to the upper edge of the side face section 12. As a result, as shown in FIG. 4A, a wave shape (concave/convex shape) is formed at the upper edge of the side face section 12.

When an external force is applied to the bracket 1 from the front side, the side face beads 14 provide an elongation allowance to allow the upper edge of each side face section 12 to be elongated and to allow the lower edge thereof to be contracted so that the side face section 12 is deformed (for example, deformed into a chevron shape or a fan shape) in a side view. As the side face section 12 is deformed, the bottom face section 11 is bent and deformed so as to become convex upward. The portion to be bent at this time can be set (adjusted) depending on the number and the positions of the side face beads 14. Since the two side face beads 14 are provided with a slight distance therebetween in the embodiment, the bottom face section 11 is bent and deformed at the nearly central position of the two side face beads 14.

Hence, in the case that an external force is input to the inverter 3 from the front side, the bracket 1 is curved (bent) and deformed into a chevron shape or a fan shape in a side view so that the front fastening section 10A is moved upward by using the fastening point (the lower end of the rear fastening section 10B in the embodiment) of the rear fastening section 10B on the protruding section 21c as a fulcrum. In other words, by the input of the external force from the front side, the rear section of the inverter 3 is moved upward while the side face beads 14 of the bracket 1 are deformed by using the lower end of the rear fastening section 10B as a fulcrum. In other words, the deformation promoting section 10C is composed, including the two side face beads 14 provided on each of the side face sections 12, and performs control so that the bracket 1 is deformed in the deformation mode described above. Thus, the deformation promoting section 10 may be called a fragile section.

Moreover, as shown in FIGS. 3 and 4B, the bracket 1 according to the embodiment is formed so that the length of each side face section 12 in the up-down direction (hereafter referred to as the height) is smaller toward the front side. In other words, a slanting section 16 being inclined downward toward the front side is formed at the upper edge of the side face section 12. The slanting section 16 according to the embodiment is formed toward the front side from a position slightly behind the side face bead 14 on the rear side so that the height of the side face section 12 at the front end of the side face section 12 is approximately half the height of the side face section 12 at the rear end thereof. In other words, the side face beads 14 are provided on the side face section 12 on which the slanting section 16 is formed.

The slanting section 16 is a portion for allowing each side face section 12 to be deformed easily when an external force is applied to the bracket 1 from the front side. Since the bracket 1 is formed into a U-shaped in cross section, the bracket 1 has relatively high rigidity in the front-rear direction. However, in the case that an external force for pushing the inverter 3 rearward is applied from the front side, it is necessary to move the rear section of the inverter 3 upward by allowing the bracket 1 to be deformed in the above-mentioned deformation mode. The slanting section 16 is a portion in which the rigidity of the side face section 12 is suppressed low to promote (assist) the above-mentioned deformation and constitutes part of the deformation promoting section 10C. The third hole section 11c formed in the bottom face section 11 is a portion for suppressing the rigidity of the bottom face section 11 low and constitutes part of the deformation promoting section 10C as in the case of the slanting section 16.

[2. Operational Advantage]

Figure 5A:
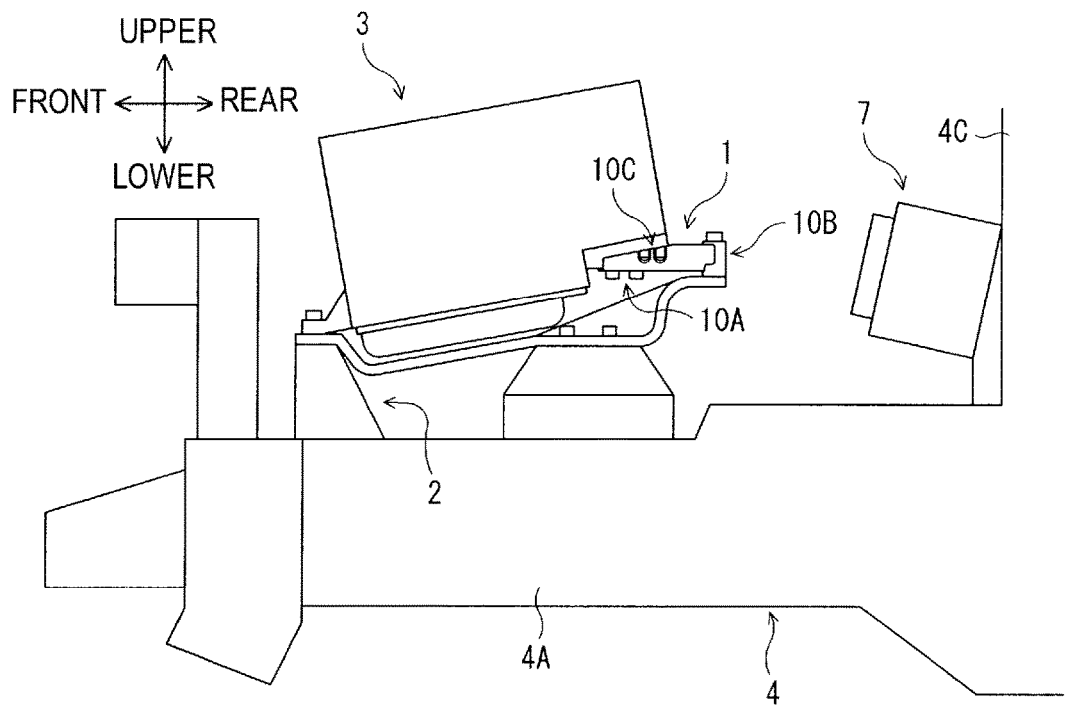
FIGS. 5A and 5B are left side views illustrating the operation of the fastening structure shown in FIG. 1.
Figure 5B:
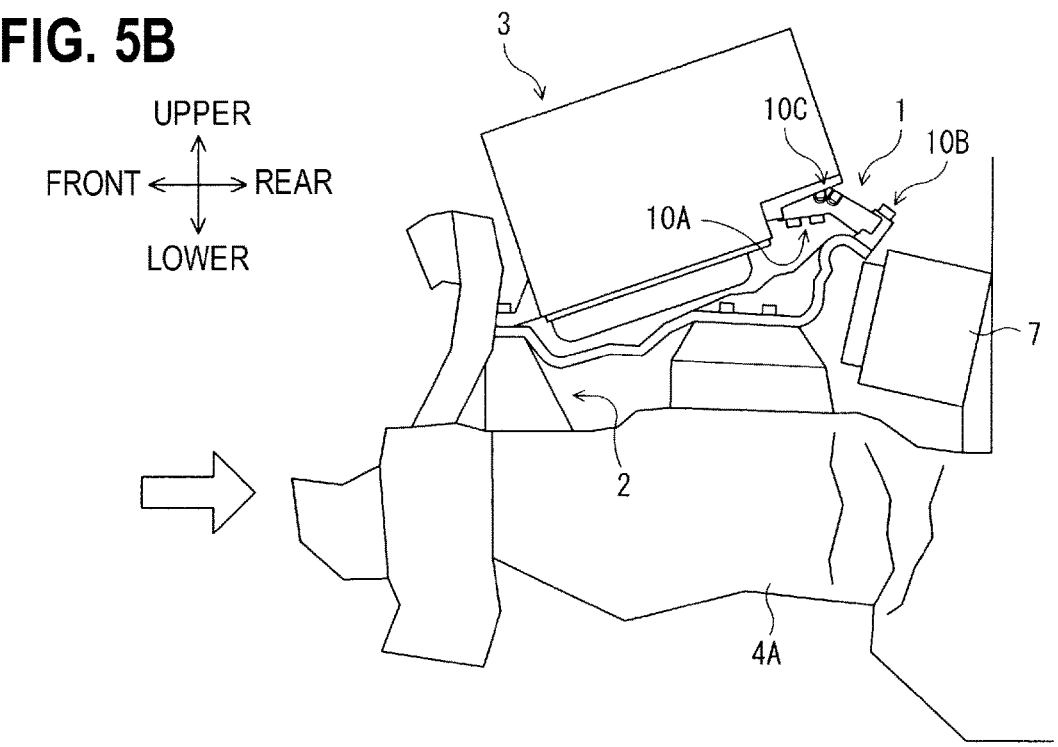

Next, the operation of the fastening structure will be described below using FIGS. 5A and 5B. FIG. 5A is a left side view showing an ordinary state (a state before a vehicle collision) of the fastening structure and also showing a peripheral structure in addition to the fastening structure shown in FIG. 1. FIG. 5B is a left side view showing a state after a vehicle collision. As shown in FIG. 5A, another apparatus 7 fastened to the front face of a dash panel 4C is disposed behind the inverter 3 that is fastened to the vehicle body 4 in a forward leaning posture. This apparatus 7 is disposed so as to be overlapped with the inverter 3 in the front-rear direction. If the inverter 3 retracts rearward while hardly moving in the up-down direction, the apparatus 7 will collide with the inverter 3.

However, with the fastening structure according to the embodiment, in the case that a vehicle makes a front collision and an external force is input to the inverter 3 from the front side, the bracket 1 is deformed so that the front fastening section 10A is moved upward while the deformation promoting section 10C is deformed by using the lower end of the rear fastening section 10B as a fulcrum as shown in FIG. 5B as described above. In other words, the bracket 1 is deformed in the deformation mode in which the side face beads 14 of the bracket 1 provide an elongation allowance to allow the upper edge of the side face section 12 to be elongated and to allow the lower edge thereof to be contracted and the bottom face section 11 is curved (bent) so as to become convex upward and formed into a chevron shape or a fan shape in a side view. As a result, the rear section of the inverter 3 to which the bracket 1 is fastened is moved upward and the inverter 3 takes a more forward leaning posture, whereby the rear section of the inverter 3 takes a locus avoiding the contact with the apparatus 7 that is disposed behind the inverter 3.

Hence, with the above-mentioned fastening structure, when an external force is input from the front side due to a vehicle collision, the rear section of the inverter 3 can be moved upward by the deformation promoting section 10C made of sheet metal by using the rear fastening section 10B as a fulcrum. Consequently, the inverter 3 is avoided from colliding with the apparatus 7 that is disposed behind the inverter 3. Furthermore, since the deformation promoting section 10C is provided in the bracket 1 for fastening the inverter 3 to the vehicle body 4, increase in weight and cost can be suppressed.

With the above-mentioned fastening structure, since the bracket 1 has the bottom face section 11 extended in the front-rear direction and the two side face sections 12 standing upright upward from both the edge sections of the bottom face section 11 extending in the front-rear direction, the strength of the bracket 1 can be secured while the weight of the bracket 1 is reduced. In other words, in an ordinary state (before a collision), the inverter 3 can be securely held (fastened) to the vehicle body 4 by the bracket 1 while increase in weight is suppressed. Furthermore, since the side face beads 14 extend in the upright standing direction of the side face section 12 and are formed into a convex shape so as to protrude outward, the elongation allowance at the time when the bracket 1 is deformed in the above-mentioned deformation mode can be secured. Hence, the deformation of the bracket 1 can be promoted and the protecting property of the inverter 3 at the time of a vehicle collision can be enhanced.

Furthermore, with the above-mentioned fastening structure, since the side face beads 14 are extended up to the upper edge of the side face section 12 and the concave/convex shape is formed at the upper edge of the side face section 12, the side face section 12 can be deformed so that the upper edge thereof is elongated and the lower edge thereof is contracted (for example, deformed into a chevron shape or a fan shape) in a side view. Hence, the inverter 3 can be moved upward at the time of a vehicle collision, whereby the protecting property of the inverter 3 can be further enhanced.

Moreover, with the embodiment, since the side face beads 14, plural in number, are provided side by side on each of the two side face sections 12 in the front-rear direction, a larger elongation allowance can be secured at the time of the deformation of the bracket 1, whereby the deformation of the bracket 1 can be promoted and the protecting property of the inverter 3 at the time of a vehicle collision can be further enhanced.

What's more, with the above-mentioned fastening structure, each of the two side face sections 12 of the bracket 1 is formed so that its length in the up-down direction is smaller toward the front side, and the slanting section 16 is provided at the upper edge of the side face section 12. Hence, when an external force is input from the front side, the deformation of the bracket 1 can be more promoted, and the protecting property of the inverter 3 at the time of a vehicle collision can be even further enhanced.

Regardless of the embodiment described above, the embodiment can be variously modified and made without departing from the spirit thereof. The respective configurations of the embodiment can be selected as necessary or may be combined appropriately.

Although the inverter 3 has been taken as an example of an onboard apparatus and described, the onboard apparatus to be fastened by the bracket 1 is not limited to the inverter 3, but the embodiment is applicable to any apparatuses that are mounted in the engine room or the motor room.

Figure 6A:
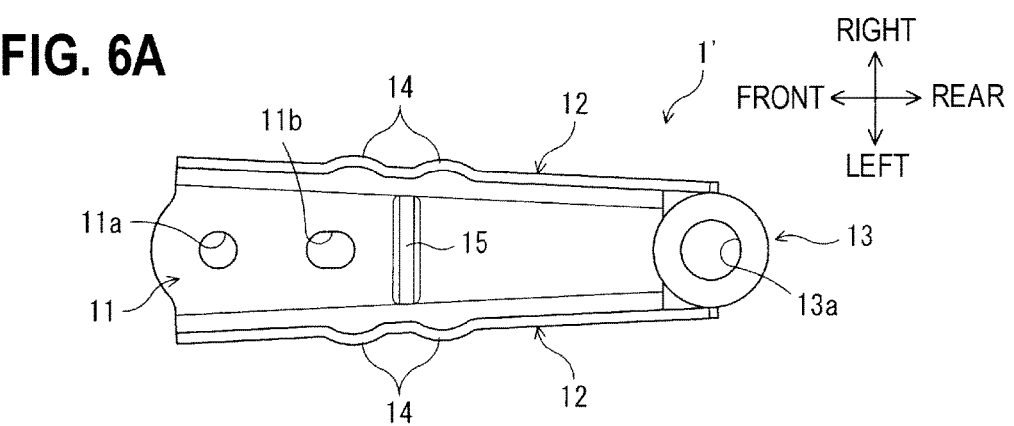
FIGS. 6A and 6B are views showing a modification of the bracket shown in FIG. 2.
Figure 6B:
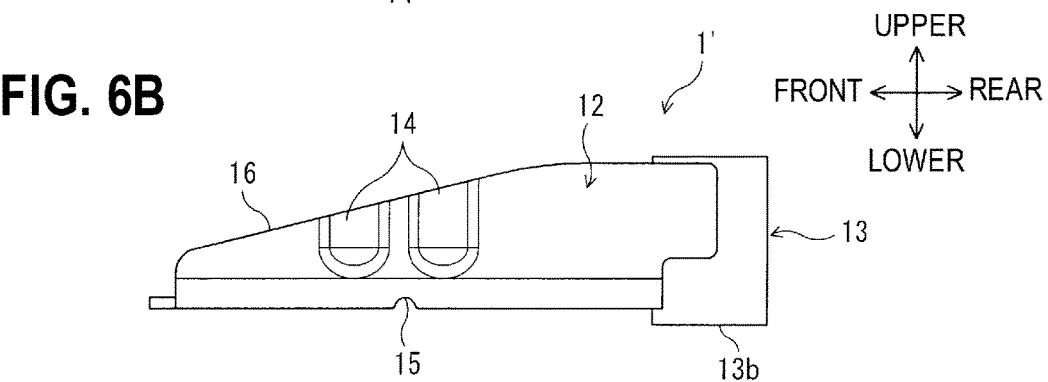

Furthermore, the specific shape of the bracket 1 is not limited to the shape described above. For example, as shown in FIGS. 6A and 6B, a bracket 1' provided with a bottom face bead 15 extending in the direction (the left-right direction) orthogonal to the extension direction (the front-rear direction) of the bottom face section 11 and formed into a convex shape protruding inward (upward), instead of the third hole section 11c formed in the bottom face section 11, may be used to fasten the onboard apparatus 3. In this case, since the bending position of the bottom face section 11 can be set by the position of the bottom face bead 15, the locus of the onboard apparatus 3 at the time when an external force is input due to a vehicle collision can be controlled more accurately. In other words, the deformation promoting section 10C may be configured so as to include the bottom face bead 15 provided on the bottom face section 11.

Moreover, as shown in FIGS. 6A and 6B, in the case of the bracket 1' in which the two side face beads 14 are provided side by side in the front-rear direction on each side face section 12 and a single bottom face bead 15 is provided at a position between the two side face beads 14 arranged side by side, the two side face beads 14 are used to provide the elongation allowance at the time of the deformation and the single bottom face bead 15 is used to serve as a bending portion, whereby the deformation of the bracket 1' can be performed in a predetermined deformation mode (the deformation can be controlled). Hence, the locus of the onboard apparatus 3 at the time of a vehicle collision can be controlled more accurately.

Although the side face beads 14 of each of the above-mentioned brackets 1 and 1' are formed into a convex shape so as to protrude outward, they may be formed into a convex shape so as to protrude inward. Alternatively, the side face bead 14 formed into a convex shape so as to protrude inward and the side face bead 14 formed into a convex shape so as to protrude outward may be provided side by side in the front-rear direction. Furthermore, the lower ends of the side face beads 14 may be extended to the bottom face section 11.

Besides, a bracket not provided with either the third hole section 11c or the bottom face bead 15 in the bottom face section 11 may be used. Even a bracket not provided with a bending promoting portion in the bottom face section 11 may also be used, provided that the side face section 12 has the deformation promoting section 10C (for example, the plurality of side face beads 14 and the slanting section 16). In addition, the bottom face section 11 may be formed into a shape having a constant width in the front-rear direction (in other words, a rectangular shape in a top view), or the side face sections 12 may be provided so as to stand upright obliquely upward from the bottom face section 11 (in other words, expand upward).

Although the front fastening section 10A and the deformation promoting section 10C of each of the brackets 1 and 1' are made of sheet metal and the rear fastening section 10B thereof is formed into a pipe shape, the shapes and the materials of the front fastening section 10A and the rear fastening section 10B are not limited particularly, provided that at least the deformation promoting section 10C is made of sheet metal. For example, the front fastening section 10A may be formed into a pipe shape and the rear fastening section 10B may be made of sheet metal. Moreover, the fastening point (the position of the front fastening section 10A) of the bracket 1 on the onboard apparatus 3 and the fastening point (the position of the rear fastening section 10B) of the bracket 1 on the support member 2 are not limited to those described above, but are set appropriately depending on the positional relationship among the onboard apparatus 3 to be fastened, the vehicle body and other apparatuses.

In the above embodiment, as shown in FIG. 1, the onboard apparatus 3 is fastened to the front side of the vehicle body. The front-rear direction may be reversed in the embodiment. With this configuration, when an external force is input from the rear side of the vehicle body, a front section of the onboard apparatus fastened to the rear side of the vehicle body can be moved upward by the fragile section.

What is claimed is:

1. A fastening structure of an onboard apparatus to be fastened to a vehicle body comprising:
   a support member that is configured to be fastened to the vehicle body to support the onboard apparatus and has a protruding section protruding rearward beyond a rear face of the onboard apparatus when the onboard apparatus is fastened to the vehicle body; and
   a bracket having:
      a front fastening section to be fastened to a lower face of a rear section of the onboard apparatus;
      a rear fastening section to be fastened to the protruding section of the support member; and a fragile section provided between the front fastening section and the rear fastening section,
wherein by an external force from a front side of the onboard apparatus, the fragile section is deformed and the rear section of the onboard apparatus is moved upward using the rear fastening section as a fulcrum.

2. The fastening structure of the onboard apparatus according to claim 1, wherein the bracket has a bottom face section extending in a front-rear direction and two side face sections standing upward from both edge sections of the bottom face section extending in the front-rear direction,
the fragile section includes side face beads provided on each of the two side face sections, extending in a standing direction of the side face sections and formed into a convex shape protruding inward or outward, and
the side face beads extend up to upper edges of the side face sections.

3. The fastening structure of the onboard apparatus according to claim 2, wherein the side face beads are provided on each of the two side face sections side by side in the front-rear direction.

4. The fastening structure of the onboard apparatus according to claim 2, wherein the fragile section includes a bottom face bead provided on the bottom face section, extending in a direction orthogonal to an extension direction of the bottom face section and formed into a convex shape protruding inward.

5. The fastening structure of the onboard apparatus according to claim 4, wherein the side face beads are provided on each of the two side face sections so that two side face beads are provided side by side in the front-rear direction, and
the bottom face bead is one bottom face bead positioned between the two side face beads provided side by side.

6. The fastening structure of the onboard apparatus according to claim 2, wherein the closer to the front side a position gets, the smaller the length of each of the two side face sections of the bracket in an up-down direction becomes.

7. The fastening structure of the onboard apparatus according to claim 2, wherein the closer to the front side a position gets, the larger a length of the bottom face section in a vehicle width direction.

8. The fastening structure of the onboard apparatus according to claim 2, wherein a front edge section of the bottom face section is formed into a curved shape.

9. The fastening structure of the onboard apparatus according to claim 2, wherein the fragile section further includes a hole section provided on the bottom face section at a position to which the side face beads corresponds in the front-rear direction.

* * * * *